Patented June 9, 1931

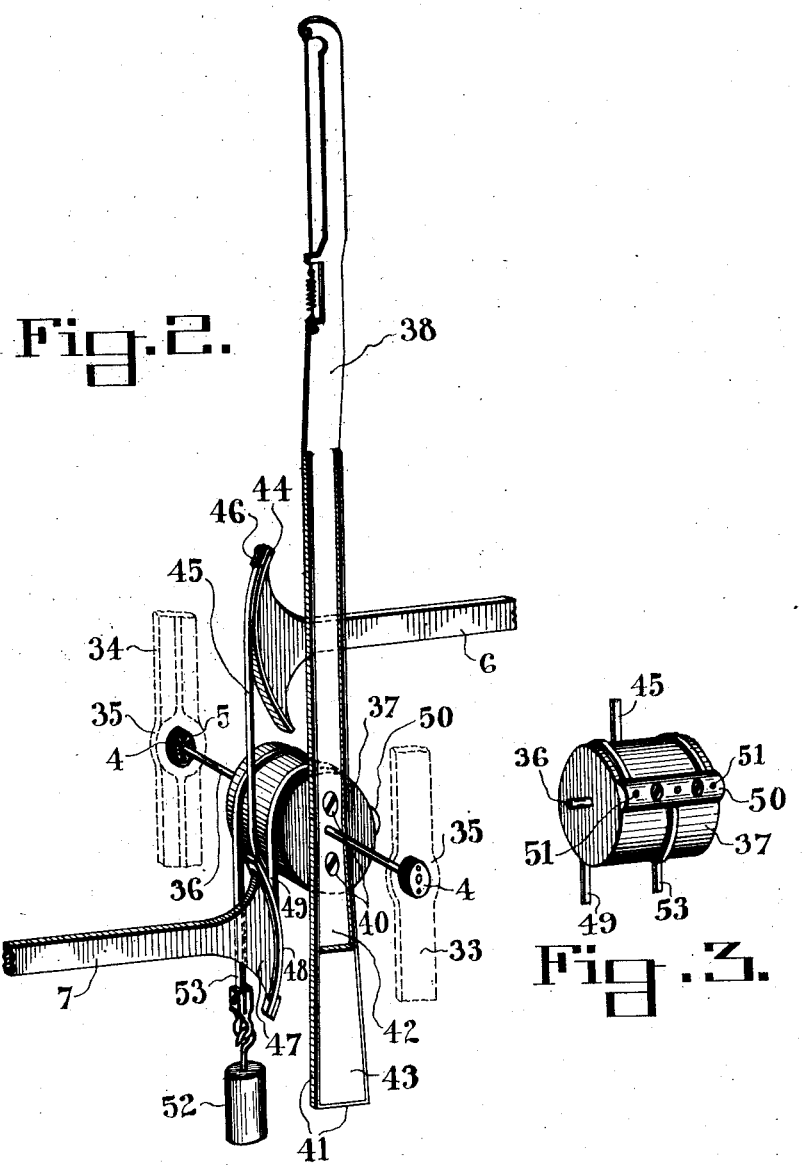

1,809,692

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

SCALES

Application filed June 27, 1927. Serial No. 201,780.

This invention relates to weighing machines and more particularly to that class of weighing machines commonly designated as computing scales, which scales not only indicate the weight of the article being weighed, but also serve to indicate the result of certain computations having relation to the weight of the article being weighed.

Devices of the class referred to, as heretofore commonly constructed, have employed knife edge bearings of hard steel, the knife edge pivot resting in a grooved bearing. One disadvantage of this type of bearing construction resides in the fact that when the scale is out of level or when subjected to an impact of any force the alignment of the bearings is destroyed. This obviously results in variations in the indications of the instrument, as the alignment of the knife edge bearings must be maintained as constant as possible for each position of deflection of the pendulum lever. It is accordingly an object of this invention to provide an improved scale which will be free from the above mentioned and other disadvantages and which will be especially simple in construction and efficient in operation.

In one aspect the invention comprises the provision in a scale having a drum and opposed pendulum arms connected thereto, of shafts supporting the drum and pendulum arms which are journaled in roller bearings.

Another object of this invention is to provide an indicator arm which is balanced relative to its axis. In the illustrative construction this comprises an indicator arm rigidly fastened to the drum, said indicator arm having flanges in its lower extremity which form a pocket into which sufficient balance weight is placed in order that the portions on either side of the axis of the drum shall be equal in weight. In other words, the drum and its attached indicator arm are in neutral equilibrium whatever the position the pendulum levers which are connected to the drum assume. This balanced indicator arm construction results in more accurate weight indications as the center of gravity of the drum and indicator will not be raised or lowered by any displacement thereof thru the action of the pendulum levers.

Other features of this invention together with certain details of construction and combination of parts, will be discussed in the specification and pointed out in the appended claims.

In the accompanying drawings:

Fig. 2 is a detail view of the connection between the drum and the pendulum arms; and Fig. 3 is a detail showing the manner of attaching the flexible steel tapes to the drum.

Figure 1:
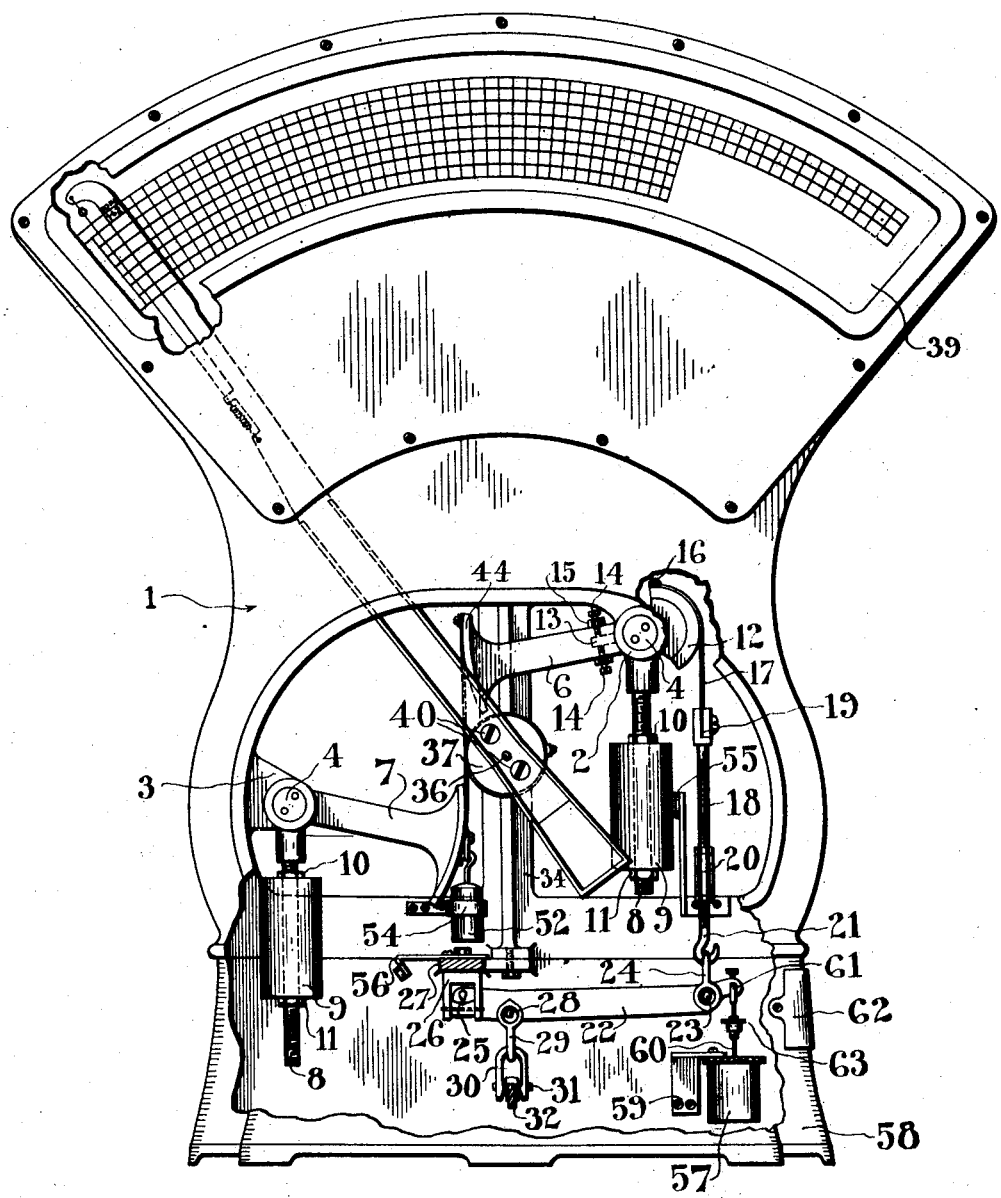
Fig. 1 is a front elevation of the preferred embodiment of the invention with portions of the housing broken away to expose the complete head mechanism of the scale.

In the illustrative device is shown a casing for the head mechanism generally indicated by the reference numeral 1 and integrally formed thereon are apertured bosses 2 and 3, the apertures of which are screw-threaded to receive containers 4 which house ball bearings 5. The containers are threaded on their outer peripheries for cooperation with the threads of the apertures in the bosses.

Journalled in the ball bearings 5 are a pendulum arm 6 and an auxiliary pendulum arm 7 forming a pair of opposed pendulum arms, the axes of their supporting shafts being in different planes. The pendulum arms 6 and 7 have integral therewith threaded stems 8 on which are mounted for vertical adjustment pendulum weights 9 having threaded bores adapted to cooperate with the threaded stems 8. The weights 9 are maintained in adjusted position by means of nuts 10 and 11.

Mounted on the same shaft as pendulum arm 6 but being eccentric thereto is a correction cam 12 having an integral tongue 13. Set screws 14 bearing upon opposite sides of tongue 13 are adapted to adjust the cam 12 relative to the pendulum weight, as is well understood in the art. The cam is locked in adjusted position by means of lock nuts 15. Attached to the correction cam 12, as by means of a clip 16, is a flexible tape 17, of steel, or other suitable material, the lower extremity of the tape being attached to a connecting rod 18 by a clip 19. The length of the connecting rod 18 may be adjusted by means of a turnbuckle 20 which connects the rod to a hook 21.

A shelf lever 22 having a pivot 23 fixed in the tip end thereof is suspended from hook 21 by means of a loop 24. The shelf lever is fulcrumed, as at 25, in a fulcrum stand 26 suitably attached to a cross-piece 27 integral with frame 1. Intermediate the fulcrum point and tip pivot, the shelf lever carries a load pivot 28 upon which is supported a loop 29. A loop 30 suspended from loop 29 supports a pivot 31 set in the tip of a transverse extension lever 32 of the scale levers (not shown).

The frame 1 has integral therewith vertical cross members 33 and 34 having thickened portions substantially centrally thereof. These portions are apertured, as at 35, said apertures being screw-threaded. In these apertures are screwed the containers 4 housing the ball bearings 5 similar to the containers and ball bearings above mentioned. A shaft 36 supporting a drum 37 is journalled in the ball bearings 5 mounted in the vertical cross-pieces 33 and 34. An indicator arm 38 adapted to swing across the face of a fan shaped computing chart 39 set in the head of the scale is rigidly attached to the drum 37.

The indicator arm has integral flanges 41 which are adapted to form a pocket 42 in the butt end thereof. This pocket is adapted to receive a balance weight of a mass sufficient to balance the drum and indicator arm, that is, the portions of the indicator arm on either side of the axis of the drum shall be equal in weight forming an indicator arm and drum construction of neutral equilibrium. The pendulum arm 6 has integral therewith a segment 44 to which is attached a flexible steel tape 45 by a clip 46. Similarly, the auxiliary pendulum arm 7 has an integral segment 47 to which is attached, as by a clip 48, a flexible tape 49. The opposite extremities of tapes 45 and 49 are fastened to drum 37 by means of clip 50 and pins 51.

A weight 52 which is adapted to balance the indicator arm at its zero reading is suspended from drum 37 by means of a flexible tape 53, said tape being attached to the drum in the same manner as tapes 45 and 49. The balance weight 52 is guided in its vertical reciprocation by a ring bracket 54 suitably attached to the frame 1.

Buffers 55 and 56 are adjustably mounted on frame 1 and are adapted to limit the outward movement of pendulum weights 9.

For moderating the vibration of the scale parts, dampening means is provided in the form of a dash pot 57 suitably attached to the base housing 58 by means of a bracket 59.

The piston rod 60 is attached to the shelf lever, as at 61. A cover plate 62 is removably mounted over an opening in the base housing for the purpose of admitting the thumb and index finger of a hand to manipulate an adjusting nut 63 on piston rod 60.

Having thus described my invention, what I claim as new and desire to secure by Letters Patent in the United States, is:

1. In a device of the character described, a frame, opposed pendulum arms carrying pendulums and a drum mounted in the said frame, an indicator arm attached to said drum, means connecting the said pendulum arms to said drum, and a balancing weight attached to said indicator arm and adapted to return the indicator arm to normal position after a weighing operation.

2. In a device of the character described, a frame, ball bearings mounted in said frame, a plurality of shafts journalled in said bearings, opposed pendulum arms and a drum supported on said shafts, an indicator arm attached to said drum and means connecting said pendulum arms to said drum, said means comprising a plurality of flexible tapes.

3. In a device of the character described, the combination with opposed pendulum arms and a drum, of an indicator arm attached to said drum, said indicator arm being normally in neutral equilibrium with respect to the axis of said drum.

4. In a device of the character described, the combination with opposed pendulum arms and a drum connected thereto, of an indicator arm attached to said drum, said indicator arm having flanges in the butt end thereof forming a pocket.

5. In a device of the character described in combination, a frame, ball bearings mounted in said frame, a plurality of shafts journaled in said bearings, opposed pendulum arms and a drum supported on said shafts, an indicator arm attached to said drum, means connecting said pendulum arms to said drum and means for returning said indicator to normal position after a weighing operation.

6. In a device of the character described, in combination, a frame, ball bearings mounted in said frame, a plurality of shafts journaled in said bearings, opposed pendulum arms and a drum supported on said shafts, an indicator arm attached to said drum, means connecting said pendulum arms to said drum and a weight adapted to return said indicator arm to normal position after a weighing operation.

7. In a device of the character described, in combination, a frame, ball bearings mounted in said frame, a plurality of shafts journaled in said bearings, opposed pendulum arms and a drum supported on said shafts, an indicator arm attached to said drum, a weight adapted to return said indicator arm to normal position after weighing operation and means for connecting said weight to said drum.

8. In a device of the character described, in combination with opposed pendulum arms and a drum operatively connected thereto, of an indicator arm mounted on said drum, a weight attached to said drum and adapted to return said indicator to normal position after weighing operation.

9. In a device of the character described, the combination with opposed pendulum arms and a drum operatively connected thereto, of an indicator arm mounted on said drum, means for returning said indicator arm to normal position after a weighing operation, said means comprising a weight flexibly connected to said drum and guiding means for said weight.

HARLAN A. HADLEY.